US008271674B2

(12) United States Patent
Takacs et al.

(10) Patent No.: US 8,271,674 B2
(45) Date of Patent: Sep. 18, 2012

(54) MULTIMEDIA TRANSPORT OPTIMIZATION

(75) Inventors: Attila Takacs, Budapest (HU); Franz Kalleitner, Sankt Georgen im Attergau (AT)

(73) Assignees: Telefonaktiebolaget LM Ericsson (publ), Stockholm (SE); Siemens Aktiengesellschaft, Munich (DE)

( * ) Notice: Subject to any disclaimer, the term of this patent is extended or adjusted under 35 U.S.C. 154(b) by 188 days.

(21) Appl. No.: 11/991,148

(22) PCT Filed: Aug. 31, 2005

(86) PCT No.: PCT/EP2005/009387
§ 371 (c)(1),
(2), (4) Date: Sep. 30, 2009

(87) PCT Pub. No.: WO2007/025560
PCT Pub. Date: Mar. 8, 2007

(65) Prior Publication Data
US 2010/0017529 A1   Jan. 21, 2010

(51) Int. Cl.
*G06F 15/16*   (2006.01)
(52) U.S. Cl. ........................ 709/231; 709/227
(58) Field of Classification Search .......... 709/231, 709/227
See application file for complete search history.

(56) References Cited

U.S. PATENT DOCUMENTS

| | | | |
|---|---|---|---|
| 5,940,610 A | 8/1999 | Baker et al. | |
| 6,011,775 A * | 1/2000 | Bonomi et al. | 370/230 |
| 6,735,190 B1 * | 5/2004 | Chuah et al. | 370/352 |
| 6,823,394 B2 * | 11/2004 | Waldvogel et al. | 709/231 |
| 6,954,800 B2 * | 10/2005 | Mallory | 709/240 |
| 7,099,946 B2 * | 8/2006 | Lennon et al. | 709/227 |
| 2001/0054084 A1 * | 12/2001 | Kosmynin | 709/218 |
| 2002/0099842 A1 | 7/2002 | Jennings et al. | |
| 2003/0041159 A1 * | 2/2003 | Tinsley et al. | 709/231 |
| 2004/0131042 A1 | 7/2004 | Lillie et al. | |
| 2004/0199653 A1 * | 10/2004 | Amini et al. | 709/231 |
| 2004/0215805 A1 * | 10/2004 | Tan et al. | 709/231 |
| 2005/0120123 A1 * | 6/2005 | Huang et al. | 709/231 |

OTHER PUBLICATIONS

International Search Report for PCT/EP2005/009387, mailed Mar. 10, 2006.
International Search Report and Written Opinion in corresponding International Application No. PCT/EP2005/009387 dated Mar. 10, 2006.
S. Wenger, M.M. Hannuksela, T. Stockhammer, M. Westerlund, and D. Singer "RTP Payload Format for H.264 Video", RFC 3984, Feb. 2005 http://tools.ietf.org/html/rfc3984.

(Continued)

*Primary Examiner* — Minh-Chau Nguyen
(74) *Attorney, Agent, or Firm* — Nixon & Vanderhye P.C.

(57) ABSTRACT

To achieve sophisticated adaptation mechanisms in a packet switched communication environment for service delivery, there is generated descriptor information on an application level. The descriptor information describes media stream control options and is provided to the packet switched communication environment prior to media streaming. Also, there is provided a method of controlling media streaming in a network apparatus operated in the communication environment using the descriptor information.

26 Claims, 9 Drawing Sheets

OTHER PUBLICATIONS

H. Schwarz, D. Marpe, and T. Wiegand, "MCTF and Scalability Extension of H.264/AVC," Proc. of PCS, San Francisco, CA, USA, Dec. 2004. http://iphome.hhi.de/marpe/download/pcs04_schwarz_marpe_wiegoand.pdf.

W. Kumwilaisak, Y. T. Hou, Q. Zhang, W. Zhu, C.-C. Kuo, and Y.-Q. Zhang, "A Cross-Layer Quality-of-Service Mapping Architecture for Video Delivery in Wireless Networks", IEEE Journal on Selected Areas in Communications, vol. 21, No. 10, p. 1685-1697, Dec. 2003. http://viola.usc.edu/Publication/PDF/selected/2003_IEEE-JSAC_Kumwi.pdf.

Toufik Ahmed, Ahmed Mehaoua, Raouf Boutaba, and Youssef Iraqi, "Adaptive Packet video Streaming Over IP Networks: A Cross-Layer Approach" IEEE Journal on Selected Areas in Communications, vol. 23, No. 2, p. 385-401, Feb. 2005. http://bcr2.uwaterloo.ca/~rboutaba/Papers/Journals/JSAC-05_2.pdf.

Braden, R., Zhang, L., Berson, S., Herzog, S. and S. Jamin, Resource ReSerVation Protocol (RSVP)—Version 1, Functional Specification, RFC 2205, Sep. 1997. http://www.ietf.org/rfc/rfc2205.txt.

* cited by examiner

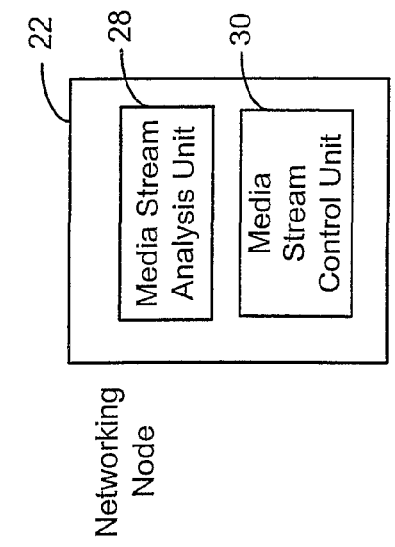
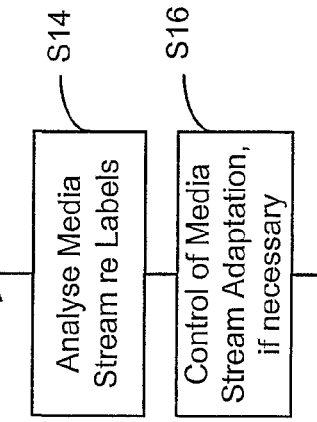
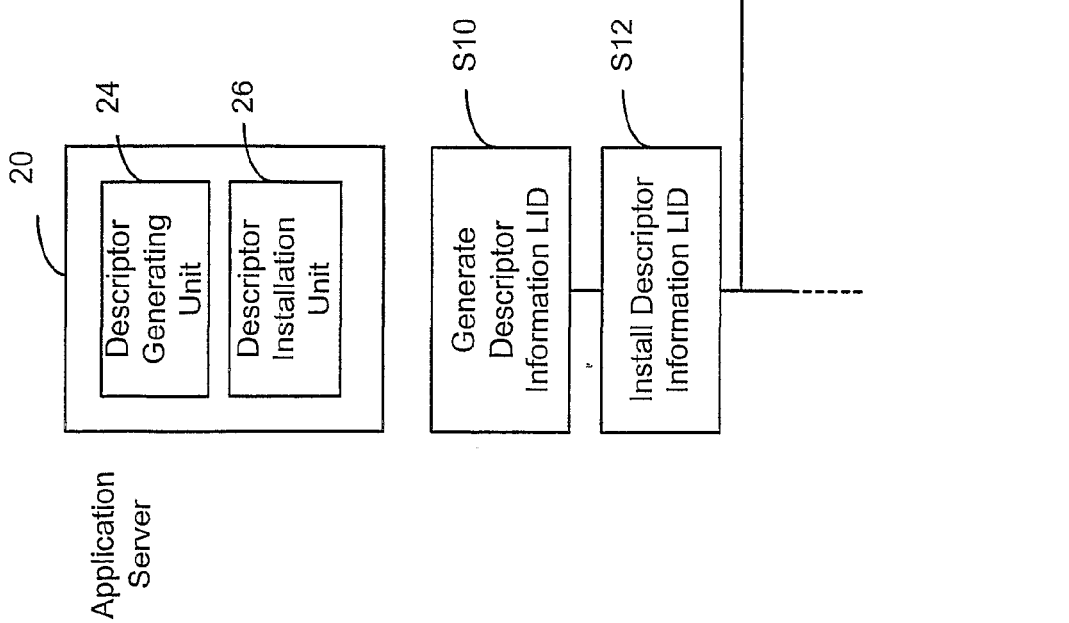
Fig. 2
Fig. 3

MULTIMEDIA TRANSPORT OPTIMIZATION

This application is the U.S. national phase of International Application No. PCT/EP2005/009387, filed 31 Aug. 2005, the entire contents of which is hereby incorporated by reference.

OVERVIEW

The present invention relates to multimedia transport optimisation through forward information signalling, and in particular to a method and apparatus of providing descriptor information reflecting options for local media adaptation in a packet switched network during a media stream and a method and apparatus of controlling a media stream using such information.

BACKGROUND

In U.S. Pat. No. 5,940,610, there is described the use of prioritized interrupt callback routines to process different types of multimedia information. Here, multimedia information passes through a system bus from a CPU main memory to a display memory in accordance with CPU commands. The information may be packetized with associated packet types identifying the different media. A media stream controller processes the information and passes the processed information to the display memory. Controllers in the media stream controller individually pass multimedia information to the display memory. A PACDAC controller in the media stream controller causes media in the display memory to be transferred to a PACDAC for display. The format, sequence, and rate of this transfer may be flexibly controlled by software on a frame by frame basis. Arbitration logic establishes priorities for the different controllers in the media stream controller so they may share a single bus for accessing the display memory. A single interrupt controller coordinates interrupts to provide priorities based upon the type of interrupt cause or media. Each interrupt cause activates only the appropriate callback functions. Two virtual machine sessions share an interrupt line to process interrupt requests from one session before processing interrupt requests from the other.

In US 2002/0099842 A1, there is described a system and method for the routing of media. The system and method for streaming media to a viewer and managing the media comprises an enhanced service routing processor, a real time switch management system, a name routing processor, and a managed media switch. The real time switch management system RTSMS has a reservation system. The enhanced service routing processor ESRP receives media from an owner, manages the media according to media rules and order rules defined by the owner, and distributes the media to one or more switches, such as the managed media switch MMS, according to the media rules and the order rules.

With the fast improvement of broadband wireless technologies, more and more demanding multimedia services are provided over wireless access communication networks. However, the highly variable nature of wireless radio communication links and the special error characteristics require special practices not just at the physical and link layer of the networking protocol stack, but also on higher layers thereof. In other words, with the spreading of wireless access technologies, the paradigm of homogeneous networks, where all links are similar in terms of delay and error probability and substantially static in nature, does not hold any longer. The wireless communication network and especially the applications using such networks must be prepared for the special properties of heterogeneous wired-cum-wireless networks.

In heterogeneous wireless communication networks, real-time service delivery is a highly non-trivial task in view of varying transport conditions which makes it difficult to meet strict delay constraints. To handle the challenging environment, the special characteristics of real-time services must be fully exploited. With real-time service delivery, unlike TCP-based applications like file download which demand lossless data transmission, a certain level of data loss is acceptable. For real-time service delivery data is assumed to be lost when packets arrive not or only too late at end user terminals. Traditionally, communication networks assume equal loss importance for each data packet and all the data in a single data packet is assumed to be equally important, e.g., each bit of a data packet has the receiving probability.

For real-time multimedia and audiovisual data traffic, this assumption does not hold. In general, consecutive data packets of a media stream carry data of different importance for user-perceived quality. Also, contents of each data packet may be related to data of various importance to achieve a certain play-out quality. E.g., although a data loss due to congestion or bad wireless communication conditions might be tolerated, it still matters what type of data is actually lost.

Thus, to cope with the above problems, there have been suggested techniques like rate adaptation RA and unequal error protection UEP, which provide means to exploit the benefits of data characteristics for real-time service delivery.

Here, with rate adaptation RA, the decrease or increase in the source bit-rate may be controlled. Hereby, during congestion or a degradation of the wireless communication the transmitted bit-rate of an application and hence the perceived quality of audiovisual data may be reduced in order to maintain an acceptable quality for service delivery.

With unequal error protection UEP, the varying importance of data can be taken into account when applying an error protection scheme for transmission during service delivery. I.e., from the viewpoint of the application, important data parts receive a stronger error protection than the less important parts.

Third generation networks like the universal mobile telecommunication system UMTS have been developed to support high data rates to permit access to a wide selection of services, besides circuit switched CS transport 3G networks implement packets switched PS data transport. Traditionally, circuit switched transport is used for voice-telephony, while packet switched traffic is used for data traffic delivery. Because circuit switched transport is highly optimised for telephony, rate adaptation RA and unequal error protection UEP are fully exploited.

Further, by realising the benefits of a packet switched transport, real-time service delivery is shifting from circuit switched transport to packet switched transport. To extend the capability of packets switched transport allowing for sophisticated rate adaptation and unequal error protection techniques, currently a narrow set of service adaptation is possible in comparison with the circuit switched domain.

With circuit switched voice-telephony, the adaptive multi-rate AMR codec, "AMR speech codec; general description", Technical Report 26.071, 3GPP, June 2002, is tightly coupled to the transport network through sophisticated adaptation mechanisms. E.g., during bad radio conditions, the data-rate of the adaptive multi-rate codec is reduced permitting the use of a stronger error protection. The radio access network RAN provides the means for this adaptation in case of circuit switched transmission, while no similar mechanisms exist for packet switched transport, although scalable codecs, unequal error protection UEP, and rate adaptation RA methods would be desirable also for packet switched based multimedia service delivery.

In more detail, with respect to packet switching, since for data transmission over a packet switched bearer the radio network controller RNC and the core network elements, serving GPRS support node SGSN and gateway GPRS support node GGSN are service agnostic, the payload format will not be interpreted by these network elements.

Also, in the circuit switched operation mode, the speech parameter bits delivered by the adaptive multi-rate AMR codec are rearranged according to their subjective importance before they are sent to the communication network. The rearranged speech parameter bits are further sorted, based on their sensitivity to errors and then are also divided into classes of importance.

Also, with respect to unequal error protection, the split over different blocks of priority is necessary. Hence, more sensitive speech bits are protected to a higher extent than less sensitive speech bits, to guarantee a certain perceived quality at the receiver.

Further, the length of the encoded speech payload may vary depending on the speech codec mode. Before transmission of the speech frames over the wireless communication channel, the splitting and reassembling of the adaptive multi-rate AMR encoded speech payload is done by the radio network controller RNC and the user equipment UE, respectively. Hence, the radio network controller RNC and the user equipment UE need the exact payload format and the block length information with respect to each priority class.

A solution could be that the radio network controller RNC becomes service aware also for packet switched transmission which, however, would have the drawback that the format and length of service data units SDU, generated by the source codec for each priority class, need to be downloaded to the radio network controller RNC, e.g., using the UMTS QoS profile description.

In this case, the problem is that the radio network controller will lose service transparency through handling of information generated on the application level. Moreover, by relaxing service-awareness of network elements, system architectures can be exploited in a simpler way, as fewer specialized equipments would be required. The need for upgrading network elements for launching new services is reduced to a minimum and might even become obsolete. This way, by relaxing service-awareness, cheaper network deployment and better service integration may be achieved.

SUMMARY

In view of the above, an object is to provide adaptation mechanisms over packet switched bearers in a communication environment for service delivery.

This object is achieved by a method of providing descriptor information, wherein the descriptor information reflects options for media stream adaptation in a packet switched network carrying a media stream for service delivery. It is suggested to generate the descriptor information as information describing at least one packet frame type in the media stream in relation to an identification of the packet frame type. In a subsequent step, the generated descriptor information is installed in networking elements of the packet switched communication network for local adaptation of the media stream in the packet switched network.

Further, the object is achieved by a method of controlling at least one media stream in a network apparatus operated in the packet switched communication network, which method uses the descriptor information provided according to the above-described method of providing descriptor information. According to the present invention, it is suggested to analyse the media stream to identify information carried in the media stream which identifies the type of packet frames carried by the media stream. Then, if necessary, the media stream adaptation is controlled through access to the descriptor information reflecting options for control of the media stream using the reference derived from the media stream to access related adaptation options in the descriptor information.

Therefore, it is for the first time suggested to generate descriptor information on different types of packet frames in a media stream, e.g., being related to audio, video, multimedia, etc. for adaptation, scaling and error protection of the media stream on a per-packet basis. As information on the different types of packet frames, e.g., information on data sub-parts carried by the packet frames is available through the descriptor information, it is even possible to achieve adaptation on a lower-than-packet-frame scale to yield fine grained adaptation information for unequal error protection and packet truncation.

Yet another important advantage is that it provides a framework independent of the application generating the media stream through use of a general, layer-independent descriptor information as data structure including important transport parameters for adaptation and error protection. This is achieved by the first method achieving a signalling mechanism that distributes the descriptor information for subsequent installing of the related information in key networking elements. Then, according to the second method outlined above, during forwarding of packet frames descriptor information is used for efficient local adaptation and improved service delivery.

Example embodiments relate to the method of providing descriptor information as outlined above, in particular the step of installing the generated descriptor information in the packet switched communication network.

According to one example embodiment, the generated descriptor information is forwarded to the packet switched communication network during set-up of a communication channel for service delivery. Alternatively, the same information may be forwarded prior to the set-up of the communication channel so as to pre-establish the descriptor information in the packet switched communication network.

According to another example embodiment, which relies on so-called pre-defined descriptor information, any specific information describing local adaptation options is not forwarded at all into the packet switched communication network. This is possible by assuming that within the overall media stream transport environment, there exists a predetermined set of pre-defined descriptor information having a fixed relation to related identification, e.g., to labels being provided with respect to each pre-defined descriptor information data structure. Then, no forwarding of related descriptor information is necessary as the reference to a label of a descriptor information is enough to gain information on options for local adaptation within the packet switched communication network.

Further example embodiments relate to the kind of the descriptor information which contains information required by network entities for local adaptation.

The descriptor information, for example, comprises three field groups: (i) traffic class group, (ii) packet drop preference group, and (iii) error protection preference group. The common traffic class group identifies general service adaptation properties. Further, the packet drop preference group specifies the drop preferences of packet frames. As for local adaptation, discarding packet frames is the only means of network elements to resolve congestion. This information provides the possibility of an application controlled discarding mechanism. Further, for sophisticated error protection, the fields of the error protection preference group can be used. Here, the requested protection level is specified along with information about the structure of the packet frame in case of a packet level unequal error protection.

The description information is a general descriptor of scalability of packets carrying, e.g., audiovisual data. I.e., for each packet frame of the media stream, generated by any audio or video encoder, a generally structured descriptor information with respect to related types of data frames can be constructed describing adaptation possibilities within the transportation network. This way, network elements being aware of the description information need not be aware of the actual encoding used and only the general descriptor information is needed for local adaptation, scaling, and error protection of the media stream.

Also, according to an example embodiment, descriptor information is not bound to a specific layer in a networking protocol stack, but used as layer independent state.

I.e., any networking layer in possession of a reference to a descriptor information has access to the corresponding descriptor information in order to exploit application preference information. Each networking layer can therefore use an information to circumvent, e.g., buffer overflow due to congestion while least effecting the user-perceived quality.

Here, e.g., link physical layers could utilize the descriptor information to apply a sophisticated channel coding and modulation techniques based on the error protection preference of the data. In fact, a joint source and channel coding are also supported which would provide for an economic transfer of packet frames depending on priority importance.

According to another example embodiment, there is provided a computer program product directly loadable into the internal memory of a service delivery apparatus or a network apparatus comprising software code portions for performing the descriptor provision and/or media stream adaptation process when the product is run on a processor of the service delivery apparatus or the network apparatus.

Therefore, technology is also provided to achieve an implementation of the method steps on computer or processor systems. In conclusion, such implementation leads to the provision of computer program products for use with a computer system or more specifically a processor comprised in, e.g., a service delivery apparatus or a network apparatus.

This programs defining the functions can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or Internet and/or telephone networks via modems or other interface devices.

BRIEF DESCRIPTION OF THE DRAWINGS

FIG. 2 shows schematic diagrams of an application server and the networking node;

FIG. 3 shows flowcharts of operation for the application server and the networking node shown in FIG. 2;

DETAILED DESCRIPTION

Insofar as different functionalities are described, it should be clear that such functionality may be achieved either in hardware, in software implemented by a computer, or through a combination thereof.

To achieve high user-perceived quality adaptive applications and adaptation supporting network entities, there is provided a general approach for scalable audiovisual service delivery wherein the focus is on control information that applications may provide to networks to guide local adaptation.

A set of relevant application layer information is collected for rate adaptation and error protection of audiovisual services which information is then forwarded to a packet switched communication network.

Figure 1:
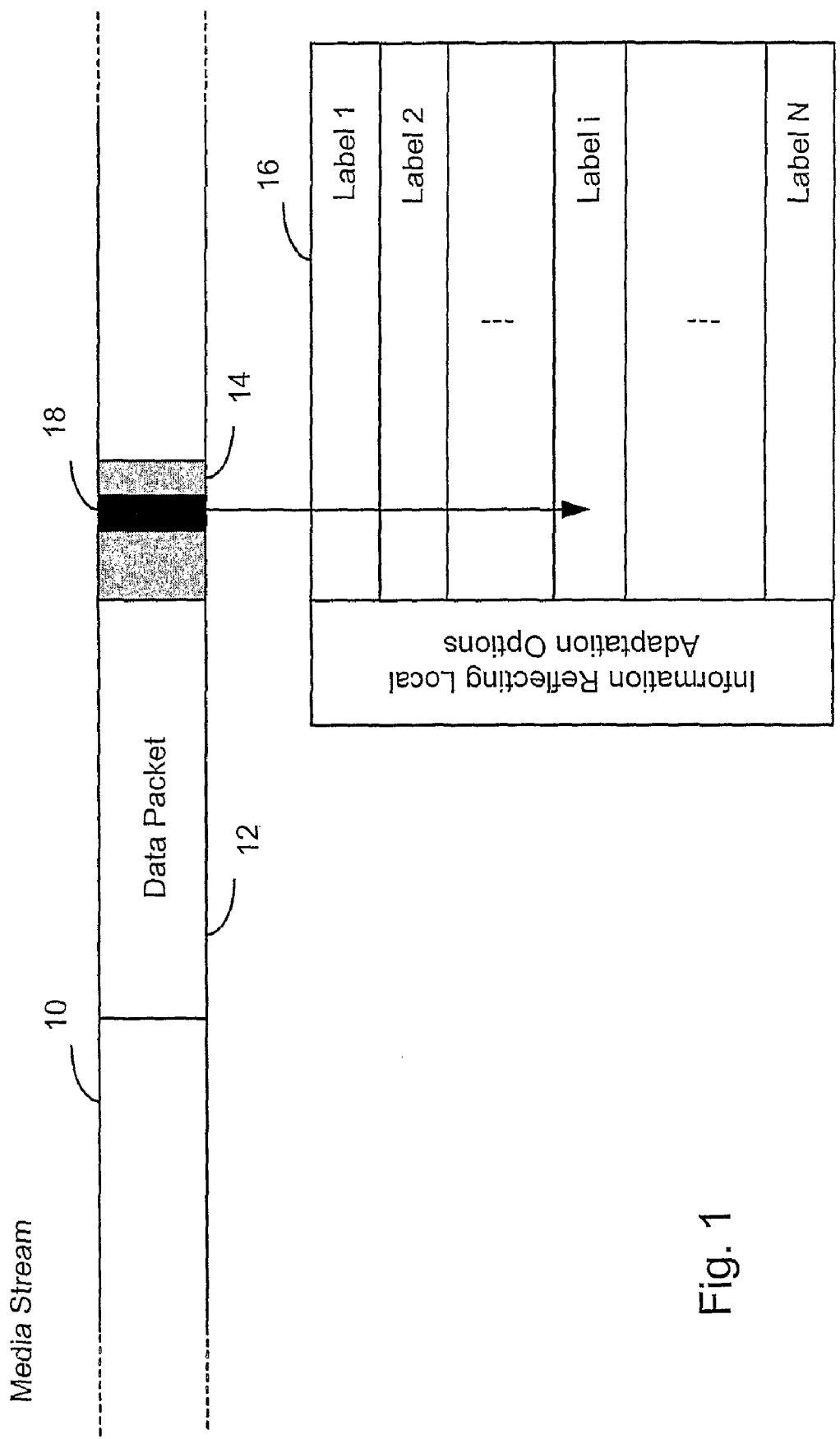
FIG. 1 shows a concept underlying scalable media streaming.

FIG. 1 shows a concept underlying scalable media streaming and/or service delivery.

As shown in FIG. 1, it is assumed that service delivery is achieved by media streaming of, e.g., audio, video, text, images, and/or audio-video, wherein a media stream 10 divides into a plurality of data packets 12, each having a header 14 for control of data transfer of the media streams through a packet switched communication network.

As shown in FIG. 1, there is suggested to have a general descriptor 16 with respect to audiovisual/real-time traffic and related media streaming. For each packet frame of the related media stream generated by any audio/speech or video application at an application node, e.g., an application server, there may be defined an appropriate descriptor LID that describes adaptation possibilities of the media stream within the packet switched communication network.

I.e., through network elements being aware of the descriptor information 16, it is possible to hide any detailed information on which type of application generating the media stream from the networking nodes and only the general description information is needed within the packet switched network for any type of adaptation/scaling/error protection and control of a media stream transmission.

As also shown in FIG. 1, it is suggested to avoid the transfer of the descriptor during actual media streaming in the packet switched communication network. This is achieved by inserting suitable information 18 into the header 14 of each packet frame 12. Without loss of generality, such type of information 18 may also be referred to as label in the following and may be, e.g., an IP address, a port number, a DiffServ code point, etc. Assuming such a label 18 being inserted into each packet frame of the media stream 10, at each networking node, through analysis of the header part 14 of each data frame to identify the label, also the corresponding information reflecting adaptation options for the media stream 10 may be generated in each networking node of the packet switched communication network without actually exchanging information on the adaptation options as such during transfer of the media stream. This is one reason why the technology described in this application achieves media stream transport optimisation through forwarding information by label signalling in a highly efficient manner.

In other words, it is suggested to have the general descriptor 16 and an appropriate mechanism for binding such descriptors to media streams 10 in the networking element. The label signalling mechanism binds the short label to each descriptor information which may be set up, e.g., in a descriptor memory in the network elements. During data transfer, the labels 18 may then be used to access the descriptor information 16 associated with the packet frame 12. Based on the descriptor information, efficient adaptation mechanisms can be initiated by the network elements, e.g., rate adaptation, scaling of the media stream, and/or unequal error protection for transmission over the packet switched communication network.

Preferably, the descriptor memory is realized such it allows access to descriptors across different layers of a networking protocol stack, e.g., on the network layer for packet discarding policy, and/or the link layer and the physical layer for efficient unequal error protection.

Thus, it is possible to operate on a sub-frame scale with respect to media stream control. In other words, consideration of sub-parts of packet frames for local adaptation is now supported—contrary to pre-existing approaches, which only handle complete data frames.

In view of the above, the technology described in this application provides means for proper application of unequal error protection UEP and rate adaptation RA/scalability functionality for video/voice over a packet switched bearer, e.g., UMTS PS. The technology described in this application may be used with any type of audio/voice or video or any other type of media application.

As will become clear from the detailed description in the following, the technology described in this application provides means for sophisticated adaptation mechanisms of packet switched bearers while avoiding the introduction of service awareness in a strict sense into the packet switched domain.

As outlined above, an important aspect is the general descriptor for media traffic such that for each packet/media frame of the media stream 10 generated, e.g., by any type of audio/speech or video coder, an appropriate descriptor may be defined describing the adaptation possibilities for the packet switched transport network. Hereby, network elements aware of the descriptor information 16 need not be aware of the actual application in generating the media stream 10, and only the general descriptor is needed for the adaptation/scaling/error protection control of the media stream 10.

To extend the service level adaptation possibilities of a packet switched communication network an overall adaptation architecture is deployed. This adaptation architecture must be in line with the trends of networking evolution, i.e. there is a need for an adaptation framework which will be applicable within future wireless networks by considering concepts of seamless integrated packet switched access networks. Further, adaptation mechanisms may be decomposed into two main components: (i) use of a feedback channel from the packet switched transport network to the related application to initiate adaptation, which will be referred to as backward information BI in the following, and (ii) the information is provided from the application to an adaptation capable networking point in the network to describe specific adaptation capabilities, which will be referred to as forward information in the following. While for backward information signalling a lot of different protocols and proposals exist, for the forwarding of allocation information no conceptual solution has been proposed so far. However, to permit the use of efficient adaptation methods the signalling of forwarding information into the packet switched communication network is a prerequisite to specify quality of service requirements in a broader sense. In other words, besides the layer and jitter constraints and lost probability bounds, additional application-specific properties must be specified to the transport network.

In the following, more details will be described with respect to FIG. 2 and FIG. 3.

FIG. 2 shows a schematic diagram of an application server 20 and a networking node 22. Here, the application server 20 running an application to generate a media stream to be handled by the networking node 22 comprises a descriptor generating unit 24 and a descriptor installation unit 26. Also, the networking node 22 comprises a media stream analysis unit 28 and a media stream control unit 30.

As shown in FIG. 3, operatively the application server 20 and the networking node 22 interact for forwarding of information from the application server running an application generating media stream to the networking node 22 executing adaptation of the media stream within a packet switched communication network.

Heretofore, operatively in a step S10 the descriptor generating unit 24 of the application server 20 generating a media stream generates the descriptor information LID, as explained with respect to FIG. 1. Thus, the step S10 generates descriptor information LID as information describing at least one packet frame type in a media stream in relation to an identification of the packet frame type, e.g., the identification being a label, as explained above with respect to FIG. 1.

Then, operatively the descriptor installation unit 26 executes a step S12 to install the generated descriptor information in the packet switched communication network for local adaptation of the media stream in the packet switched communication network.

The relation of such descriptor information LID may be achieved according to at least one option of the following three options or according to any combination thereof:

Firstly, the descriptor information may be installed in the packet switched communication network by forwarding the descriptor information to the packet switched communication network during set-up of a communication channel for service delivery.

Secondly, the descriptor information LID may be forwarded to the packet switched communication network prior to set-up of a communication channel for service delivery, so as to pre-establish the descriptor information in the packet switched communication network. This option has the benefit of reducing the amount signalling at set-up of the communication channel to pre-establish descriptor information installation.

Thirdly, one may assume that not only the descriptor information as such, but also a relation and binding between pre-established types of descriptor information and labels is available for media streaming. Then, the actual exchange of descriptor information becomes obsolete by inserting only a label into the media stream. Through such insertion and knowledge about the pre-established relation of such a label to the corresponding descriptor information, it is then possible to avoid any descriptor information data exchange.

Referring again to FIG. 3, in a step S14 operatively the media stream analysis unit 28 of the networking node 22 will analyse a media stream to identify at least one label carried in the media stream. Then, in a step S16 operatively the media stream control unit 30 will control the media stream, if necessary, through access to the descriptor information available for the networking node 22 using the identified at least one label for access to the descriptor information describing at least one packet frame type in the media stream in relation to a label carried in the media stream for reference to the packet frame type description.

In the following, more details of the application server 20 and related operation will be explained with respect to FIGS. 4 and 5.

Figure 4:
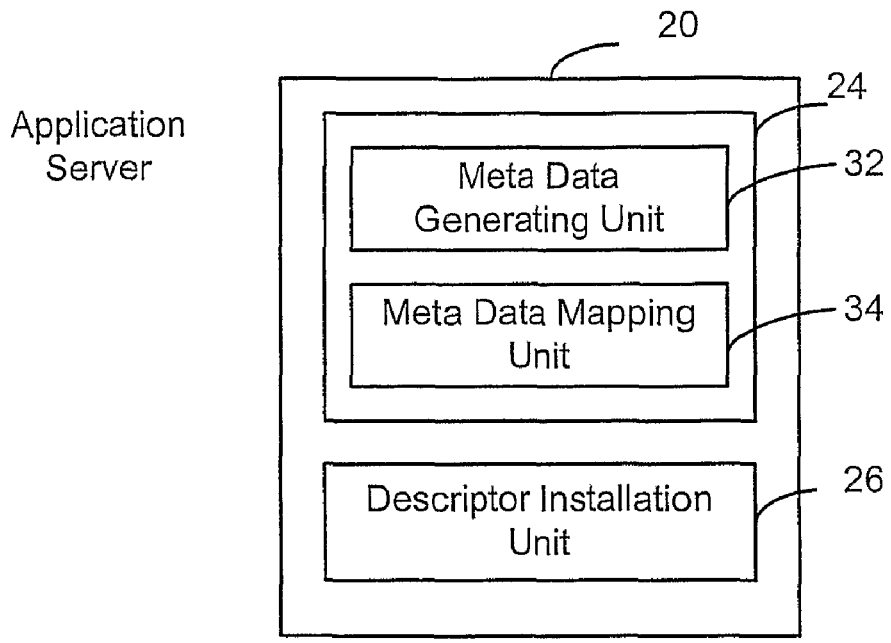
FIG. 4 shows a further detailed schematic diagram of the application server shown in FIG. 2.

As shown in FIG. 4, the descriptor generating unit 24 comprises a meta data generating unit 32 and a meta data mapping unit 34.

Figure 5:
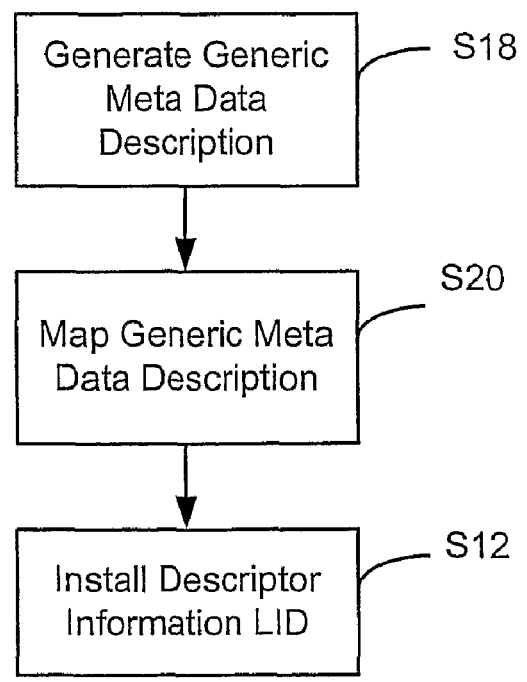
FIG. 5 shows a flowchart of operation of the application server shown in FIG. 4.

As shown in FIG. 5, in a step S18 operatively the meta data generating unit 32 will generate a meta data description of adaptation options for the media stream or, in other words, a description of related adaptation protocol abstracted from details without knowledge of the physical layer protocol and the link layer protocol.

The execution of step S18 considers the fact that besides specific information that is needed by the network from QoS perspectives, like data rate, delay bounds, etc., more detail-per-packet information is desirable. Preferably, this type of information passes some security checks in order to not abuse or attack communication networks.

As outlined above, preferably the descriptor is a layer-independent descriptor LID, which contains information required for network elements for rate adaptation, unequal error protection, and other important source codec-specific properties. Therefore, the descriptor LID is a general descriptor for audiovisual real-time traffic.

I.e., for each packet/media frame of the media stream generated by any audio/speech or video encoder an appropriate LID descriptor may be defined which describes the adaptation possibilities for the transport network. Therefore, network elements aware of the descriptor information LID need not aware of the actual encoder in use, and only the general descriptor information LID is needed for adaptation/scaling/error protection control of the media transport stream.

To give a further insight into what is meant by a media description, one could refer to H.264/AVC as a non-binding example. For the protocol, a real-time transport protocol RTP payload format is specified, S Wenger, M. M. Hannuksela, T. Stockhammer, M. Westerlund, and D. Singer, "RTP Payload Format for H.264 Video", RFC 3984, February 2005, which allows for packetizing one or more network abstraction layer units NALU. NALU units are the basic transport entities of the H.263/AVC framework and currently, the scalability enhancement of the H.264 video codec is led by the Heinrich Hertz Institute HHI, H. Schwarz, D. Marpe, and T. Wiegand, "MCTF and Scalability Extension of H.264/AVC", Proc. Of PCS, San Francisco, Calif., USA, December 2004, and H. Schwarz, D. Marpe, and T. Wiegand, "Combined Scalability Extension of H.264/AVC", submitted to ICIP'05.

The Heinrich Hertz Institute proposed scalability extension of H.264 RTP header format consisting of eight bits. The first three bits (L2, L1, L0) indicate a layer, where layers are used to increase spatial resolution of a scalable stream. E.g., slices corresponding to layer-0 describe the scene at a certain resolution. If an additional set of layer-1 slices are available, the scene can be decoded at a higher spatial resolution. The next three bits (T2, T1, T0) indicate a temporal resolution. Slices assigned to temporal resolution 0 (TR-0) correspond to the lowest temporal resolution, e.g., when only I-frames are available. If also TR-1 slices are available, the frame-rate can be increased (temporal-scalability). The last two bits (Q1, Q0) specify a quality level (QL). QL-0 corresponds to the lowest quality. If additional QL slices are available, the quality can be increased (SNR-scalability).

Here, for the given example the structure of the NALU units is static and therefore used as input to the generation of generic meta data.

In other words, based on the properties of the application and the scalable codec running in support of the application, an application of an application server 20 defines a generic meta data description, e.g., through set-up of NALU units, which specify how to process the payload of the media stream 10 in case of temporary or persistent congestion or in case of transmission quality concerns.

E.g., based on information comprised in the NALU units, information on packet dropping preferences may be set up for the descriptor LID. E.g., assigning a lower drop preference to base quality layers (layer-0, TR-0, QL-0) and a higher drop preference to the other ones would be an appropriate means to set-up of drop preference information. Also, if the network abstraction layer units NALU indicate fine granularity scaling data for translation of parts of packet frames, related information may be incorporated into the descriptor information LID along with a specification of the base length for each type of packet frame.

Further, for sophisticated error protection the descriptor information LID may specify requested protection levels along with information about the structure of packet frame types for packet level unequal error protection. Such a structure may be specified defining the starting points inside the packet frame for data corresponding to certain unequal error protection levels. This is done by, e.g., assigning an offset length to each unequal error protection level. Also, as audio-visual data/codecs may be bit error tolerant, a related indicator field for corrupted packet delivery request may also be included.

Irrespective of what type of information on structure of the media stream is generated on the application layer, according to FIG. 5 operatively in a step S20 a meta data mapping unit 34 will achieve a representation or a mapping of the information generated in step S18 according to a specification which is usable by the network elements in the packet switched communication network.

The outcome of this mapping step S20 is the descriptor information which is forwarded into the packet switched communication network. An example of such a descriptor information is shown in FIG. 6.

Figure 6:
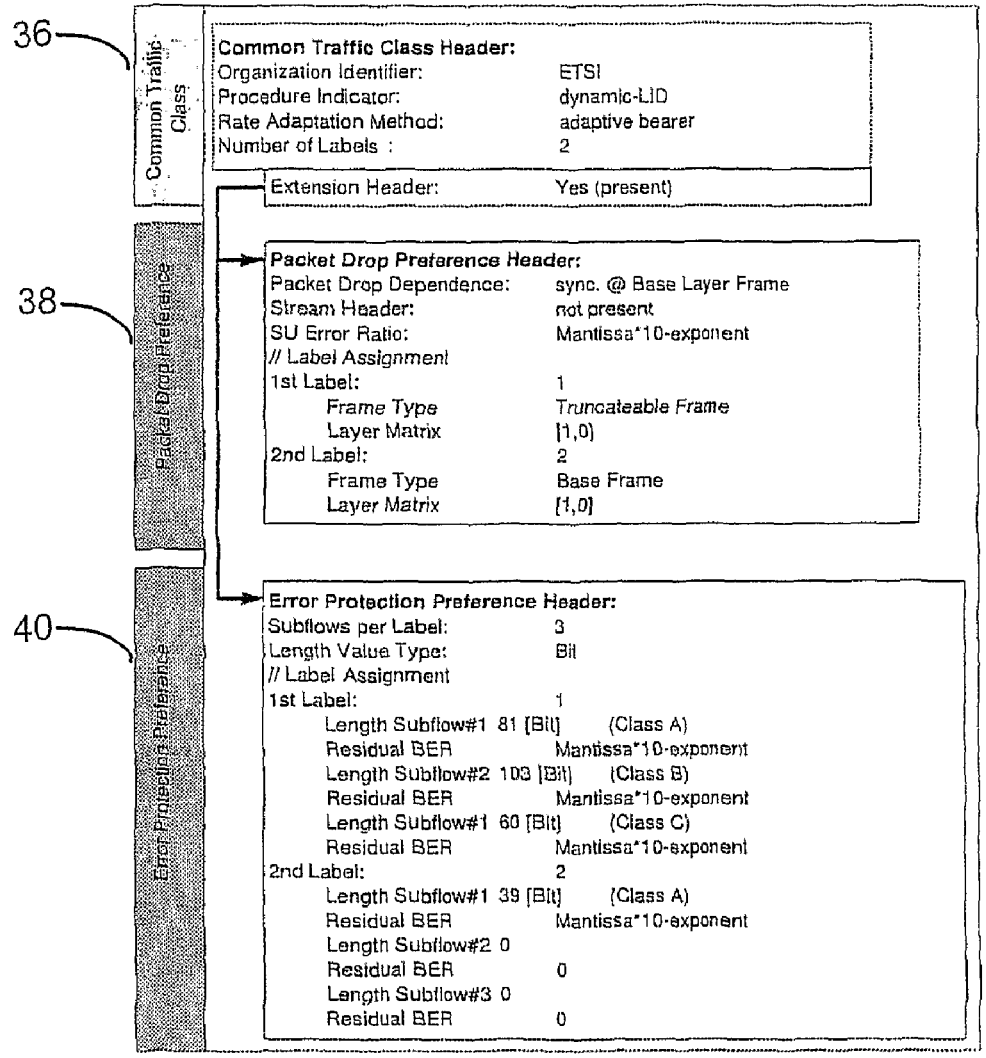
FIG. 6 shows a further detailed schematic diagram of the networking node shown in FIG. 2.

As shown in FIG. 6, the descriptor information may divide into a common traffic class 36, a packet drop preference 38, and an error protection preference 40.

Here, the common traffic class 36 includes parameters to specify the pattern of the descriptor information LID which varies depending on the selected type of media stream. The organization identifier reflects the type of organization which specifies the protocol underlying the media streaming, the procedure indicator indicates how the LID descriptor was forwarded to the networking node 22 as outlined above (during connection set-up, pre-established, pre-defined), the rate adaptation method indicates the rate to achieve radio adaptation, e.g., according to the bearer level, and the number of labels indicates the availability of further information within the descriptor information LID which is a number of two for the example shown in FIG. 6. Due to the existence of the packet drop preference and the error protection preference, the extension header field is set to 'yes' for the present case.

As shown in FIG. 6, the packet drop preference 38 provides framework to specify the rate adaptiveness more precisely. Each packet drop dependent field specifies whether the encoder and decoder will be synchronized again after a packet loss, which is on the base layer level according to the example shown in FIG. 6. In particular, this is a necessity for layered media encoders, wherein the synchronization might be achieved at different levels within the layered architecture. Here, if a packet is lost or truncated between two subsequent synchronization points (base packets), all subsequent packets shall be dropped, too, until the next packet has been received.

I.e., because of a packet loss the decoder may run out of a synchronization which may lead to a lower playout quality. The source unit SU error ratio indicates the fraction of source units lost or detected as erroneous. This is a reliability attribute and relevant to the source units SU, which belong to header packets or packets which are assigned to the base layer. Finally, the label assignment for each particular media packet is specified. Here, two characteristics are assigned to one label, i.e. the layer to which packet belongs to and the frame type, respectively. For the example shown in FIG. 6, since the AMR voice code does not support layered encoding, only a single layer is used, while the frame type is either truncatable or of the base type.

As shown in FIG. 6, the error protection preference header 14 gives more information about the protection of a single media packet frame type. Firstly, it specifies the number of sub-flows per label indicating the number of sub-flows within a packet frame, after a similar label assignment is achieved in the sense outlined above. Further, for each label the length of each sub-flow its corresponding undetected bit error ratio RBER is specified. The latter can then be used to execute or perform unequal error protection UEP.

Therefore, from the examples shown in FIG. 6, it may be concluded that the traffic class group generally identifies whether the services loss tolerance and whether adaptive and scalable applications are operated at the service end points.

Also, the packet drop preference group specifies a drop preference on the packet levels. As for local adaptation, explained in more detail in the following, discarding of packet frames is the only means of network nodes to resolve congestion. This information provides the possibility of an application-control discarding mechanism. In general, fields describing packet drop preferences, drop dependency, and the like should be included in this group.

Moreover, packet truncation is becoming an option for rate adaptation and unequal error protection with the appearance of fine granular scalability FGS layers. For truncation, additional fields are necessary to indicate the possibility of data chopping. Fields specifying the offers of truncation points might also be needed, and offsets are used to define a base-length, and if required explicitly specify the chops for adaptation.

The base-length defining the smallest size of payloads is still useful for decoding. As no gain in terms of scalability may be reached by truncating a media payload below the base-length, in this case the entire packet frame should be discarded. Therefore, the base-length covers headers and data bytes that are mandatory for decoding.

While above important fields to be included in a descriptor information LID have been explained with respect to FIG. 6, further and/or less fields are also be envisaged.

As outlined above, a descriptor information LID includes an extensive set of information for each single packet frame. However, the required overhead of including a descriptor label may also be avoided. Assuming a narrow set of information, e.g., the differentiated services architecture may be utilized by assigning the most significant descriptor sets to certain differentiated services classes. For this type of mapping frameworks are available, as described in, e.g., W. Kumwilaisak, Y. T. Hou, Q. Zhang, W. Zhu, C.-C. Kuo, and Y-Q. Zhang, "A Cross-Layer Quality-of-Service Mapping Architecture for Video Delivery in Wireless Networks", IEEE Journal on Selected Areas in Communications, Vol. 21, No. 10, p. 1685-1697, December 2003, and Toufik Ahmed, Ahmed Mehaoua, Raouf Boutaba, and Youssef Iraqi, "Adaptive Packet Video Streaming Over IP Networks: A Cross-Layer Approach", IEEE Journal on Selected Areas In Communications, Vol. 23, No. 2, p. 385-401, February 2005.

On the other hand, mapping the information of a descriptor information LID to only a handful of classes may limit the descriptor power of the forward information. Hence, an alternative solution could be to utilize the complete descriptor information LID by the network elements through the signaling approach outlined above.

In the following, in more detail the operation of the networking node 22 shown in FIG. 2 will be explained with respect to FIGS. 7 and 8, respectively.

Figure 7:
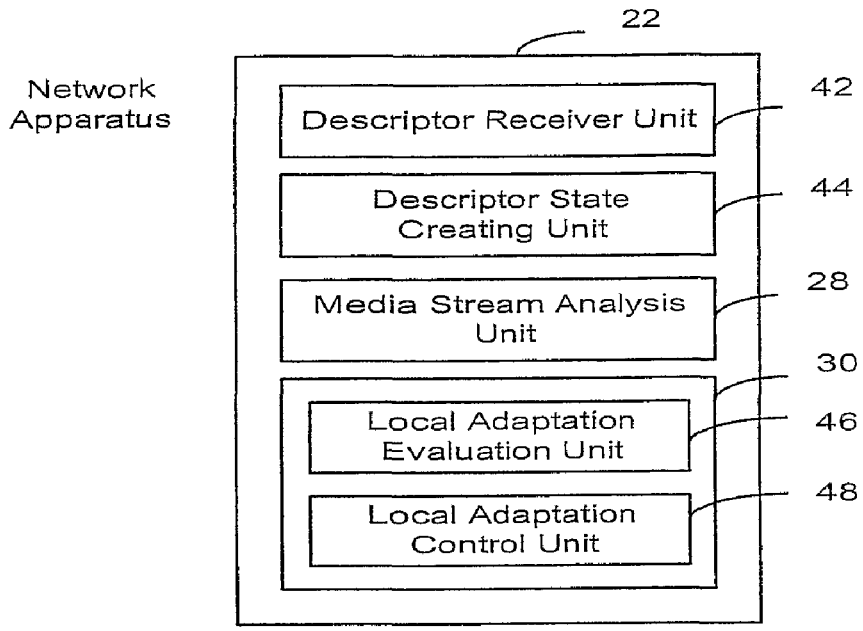
FIG. 7 shows a flowchart of operation for the networking node shown in FIG. 6.

As shown in FIG. 7, further to the media stream control unit 30 shown in FIG. 2, the networking node 22 may comprise a descriptor receiver unit 42, a descriptor state creating unit 44, which are optional components to the media stream analysis unit 28 and the media stream control unit 30. The networking node shown in FIG. 7 is particularly adapted to local adaptation, as explained in the following with respect to FIG. 7, and therefore the media stream control unit 30 comprises a local adaptation evaluation unit 46 and a local adaptation control unit 48.

Figure 8:
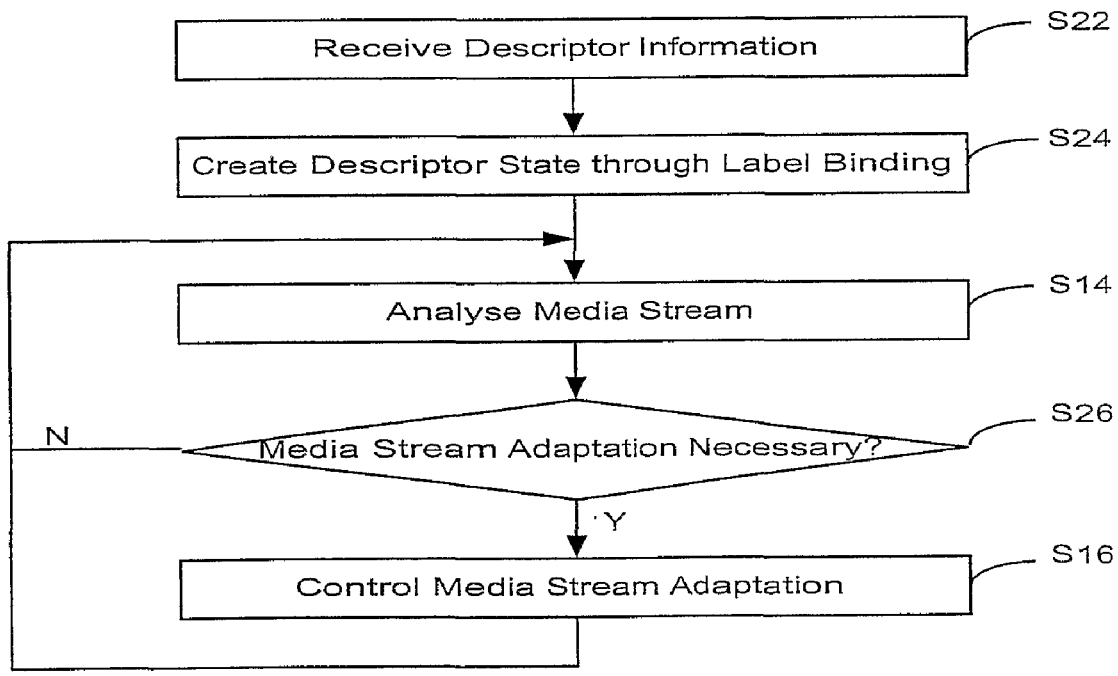
FIG. 8 shows the concept of label binding and label forwarding underlying the scalable media streaming.

As shown in FIG. 8, operatively in a step S22 the descriptor receiver unit 42 will receive descriptor information LID in preparing for a local media stream control. This may easily be achieved at the time of set-up of the communication channel for service delivery or prior to such a set-up when descriptor information is pre-established at the networking node 22.

As shown in FIG. 8, in a step S24 operatively the descriptor state creating unit 44 will establish a relation between available descriptor information and information characterizing the descriptor information within a media stream, e.g., a label. Such a process executed in step S24 will be called label binding in the following.

In more detail, the step S24 is executed by the descriptor state creating unit 44 to store a label, which may be unique within a session or a connection to each individual descriptor information LID and use the label as reference pointer between packet frames of a media stream and the descriptor information LID state established at the network node 22.

As descriptor information LID may consist of a considerable amount of information, label binding significantly reduces the overheads in a packet frame while at the same time allowing the full use of the descriptor information LID for media stream control at the networking node 22. Only the label needs to be included in packet frames of the media stream. One option would be to assign the label to differentiated service classes for otherwise forwarding it at the link layer by utilizing an extended link layer header or protocol. Further, using extended service interfaces between adjacent or non-adjacent layers, the audiovisual data may be passed between the layers along with the corresponding label so that each layer may use the descriptor information LID.

Figure 9:
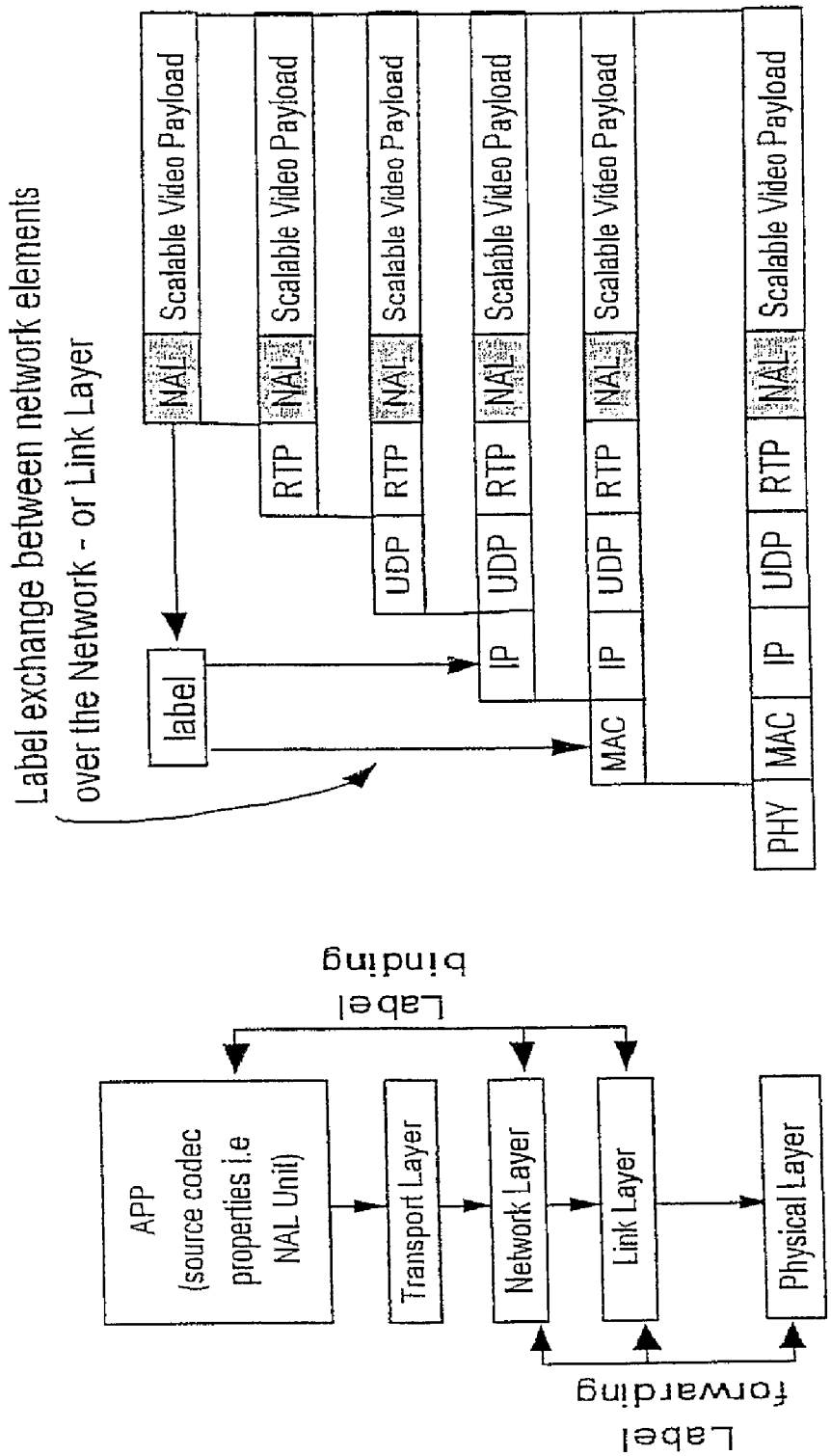
FIG. 9 shows an example of a descriptor information with example fields and values.

FIG. 9 shows on a more detailed level the concept of label binding and label forwarding underlying the scalable media streaming. The particular example shown in FIG. 9 is related to cross layer communication using labels and encapsulation of an H.264/AVC video payload and assignment of a related label performed by the application.

As shown in FIG. 9, the application running at the application server AS 20 specifies a meta data description, e.g., based on a selected video source codec and performs a binding by assigning a unique label to the related media stream. As explained with respect to FIG. 5, the meta data description will be mapped by a meta data mapping unit 34 in a step S20 onto a descriptor LID and then be forwarded together with the label to all networking elements along a transmission path for the media stream.

One such option would be to forward the descriptor information LID and the LID label, at the time of connection establishment, to the networking nodes by means of on-path resource reservation protocol. This way, besides resource reservation, the establishment and binding of LID state labels may be performed, where appropriate resource reservation protocols include RSVP, Braden, R., Zhang, L., Berson, S., Herzog, S., and S. Jamin, "Resource ReSerVation Protocol (RSVP)—Version 1, Functional Specification", RFC 2205, September 1997, and the NSIS next steps in signalling framework. Both network elements, mainly access points AP, which are aware of the proposed method, may process the signaling information, and all other networking elements may forward the LID states and related labels in a transparent manner.

Further, as shown in FIG. 9, during media streaming the exchange of labels between networking elements may be achieved at different levels of the networking protocol stack, e.g., the network layer or the link layer. Also, labels may be used on different levels of the protocol stack at different networking layers. Still further, different levels of networking protocols may, at the same time, have access with the same descriptor information state at a networking node 22. That is the reason why a descriptor information is also referred to as layer-independent descriptor information LID.

Referring back to the operation of the networking node 22 shown in FIG. 7, a further aspect of operation thereof relates to the execution of a media stream control. For the embodiment shown in FIGS. 7 and 8, the related operation is adapted to local adaptation of a media stream. Here, in step S26 the local adaptation evaluation unit 46 will examine whether an adaptation of a media stream is indeed necessary, e.g., due to local congestion within the packet switched communication network. In the affirmative case, in a step S16 operatively the local adaptation control unit 48 will execute the control of the media stream adaptation before branching back to either analysis of the media stream as shown in FIG. 8 or optionally to evaluation of the necessity of media stream adaptation (not shown in FIG. 8).

As outlined above, the media stream control executed in step S16 may consider that for audiovisual contents packet loss may be acceptable. However, to achieve graceful quality degradation, discarding of the packets must follow the actual codec preferences. In this sense, different packet frames may have different priorities in terms of drop preference and drop precedence, which is known prior to packet frame exchange in the networking elements. Moreover, to improve throughput of wireless link sophisticated error protection mechanisms may also be implemented in step S16. Unlike application-based error protection, the protection applied right at or near the wireless links using the descriptor information LID may be more effective. The reason is simply that at the application layer the protection scheme can prepare only for general packet losses.

However, over wireless links bit errors are the most common problems which result only at the end points, e.g., access points, in entire packet losses. At a wireless channel, transmission conditions may be inherently monitored and fast link adaptation is, with some restrictions, possible. Hence, local adaptation is one suggestion to enhance the performance of error protection if application preferences are also taken into account.

While over the wireless channel bandwidth a scarce resource the utilization of only equal error protection would severely decrease the overall performance experienced by an application for bit error insensitive data streams. It is for this reason that unequal error protection described herein exploits information regarding different sensitivity with respect to audiovisual content as an option.

Further to the above, local adaptation control is, e.g., applicable to audio and video coding being specifically designed for scalability, e.g., scalable video coding SVC, e.g., according to H.264/MPEG-AVC:290x/AMD. Here, the targeted functionality of scalability allows for the removal of parts of a bit stream while achieving reasonable coding efficiency of decoded video at reduced temporal, signal-to-noise ratio SNR, or spatial resolution. While there are encoders that generate scalable streams, part of such streams can be simply discarded without major quality degradation. Here, the technology described in this application makes use of this aspect and by discarding more and more data the quality gradually changes instead of a severe deterioration.

Therefore, generally scalable video codec generator stream consisting of packets that should not be dropped, e.g., non-scalable base layers, packet frames that can be dropped, e.g., spatio-temporal enhancement layers, and packet frames that could even be truncated and still be worth decoding, e.g., fine granular scalability FGS layers. Moreover, based on decoding dependency certain packet frames could be assigned in lower drop precedence than others. The reason for this differentiation is that the loss of data which is required for decoding instead of other packets may have a major impact on the user-perceived quality. Therefore, local adaptation, e.g., rate adaptation, may be achieved by simply discarding those packets which are assigned to a specific enhancement layer. Further, for unequal error protection over wireless channels, truncatable FGS layers are of special interest. During bad transmission conditions, the communication could focus on the most important parts of the packet frame and simply skip the transmission of less important bits.

Figure 10:
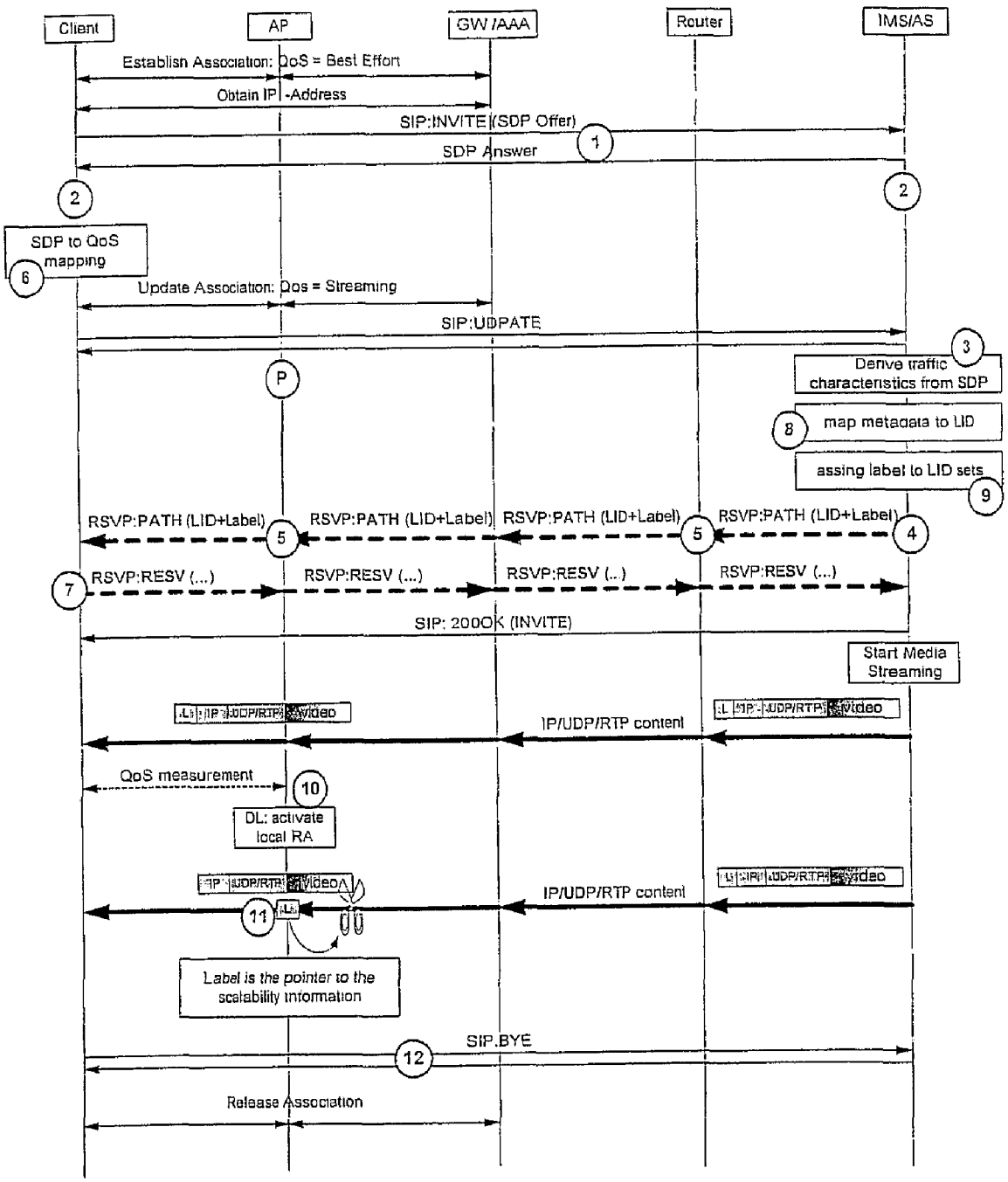
FIG. 10 shows an example of messaging between the application server, networking nodes, and a service client.

In view of the above, FIG. 10 shows an example of messaging between the application server referred to as IMS/AS in FIG. 10, different networking elements like a router, a gateway GW, and an access point AP, and a service client as an example application.

As shown in FIG. 10, a user (client) who likes to receive the streaming sources from the application server, e.g., a streaming server, provides a request for the service. In this example, a session initiation protocol SIP is used for the session to be established. Any appropriate control signaling protocol may be used, e.g., real-time streaming protocols RTSP.

As shown in FIG. 10, depending on the content of the media stream, the appropriate source codec, source codec properties and connection data, e.g., IP end point addresses are negotiated between the application server and the service client. According to FIG. 10, a SIP offer/answer model may be for that purpose ①. Apart from SIP, which is used for session establishment, the session description protocol SDP, M. Handley, V. Jacobson, "SDP: Session Description Protocol", IETF, RFC2327, April 1998, is incorporated into SIP, where the requested media, media properties, connection data and other session description parameters are specified for negotiation. Should the service client and the streaming server agree on a common media session description, the selected media service(s) are known to the entities of the signaling layer ②. In order to guarantee certain quality of service QoS at the underlying transport network, methods like QoS signaling should be applied, as will be explained in more detail in the following.

Generally, policies P along the transmission path may cover the data throughput at distinct link segments. Policies of this type may take into account the load at the link segment and may perform rate adaptation RA if congestion is detected or notified. Further, unequal error protection UEP can be applied to increase the transmission performance. Depending at which layer the policy function within the used protocol stack is active, it can either circumvent its buffer overflow due to congestion or burst resources while at least affecting the user-perceived quality or utilize the information to apply sophisticated channel coding and modulation techniques.

Generally, quality of service QoS is defined on a per-flow basis. Here, a flow is an individual, uni-directional data stream between sender and receiver. For the example shown in FIG. 10, the resource reservation protocol RSVP has been chosen, which provides resource set-up to enable integrated services per flow or aggregated traffic, including a framework to convey traffic specification from the source to the destination.

As shown in FIG. 10, the traffic characteristics are derived from the SDP parameters ③, and transferred using the RSVP PATH-message ④, which follows the downstream data route to the receiver. Each RSVP enabled router installs the PATH-state and forwards the PATH-message to the next hop on the route to the receiver ⑤. Then, the receiver responds with the RESV message, which contains the resource reservation request. These characteristics are derived from the SDP to QoS mapping ⑥. The RESV-message is sent upstream following the source route provided by the PATH-message ⑦. Hence, each RSVP enabled router executes the resource allocation.

As outlined previously, local policies perform local rate adaptation by truncation or dropping of payload data. To perform local rate adaptation RA, the exact payload format must be known by the policy function. A generic framework how to distribute such payload has been explained above in detail with reference to the layer-independent descriptors LID.

For the example shown in FIG. 10, two types of options are considered. The first one is the scaling of bandwidth and can be performed either by discarding of data packets or by reduction of packet length. Here, the decision whether a data packet may be dropped is based on the assignment of different priorities. Then a policy function having the intention to scale the bandwidth shall discard packet frames with priorities below a certain threshold. The threshold itself increases or decreases proportionally to the congestion on a particular link segment. Another way to increase the transmission performance may be achieved by splitting a data payload into truncatable sub-frames, so-called 'classes'. Here, the content of each sub-frame is specified in a range from high importance to less importance. However, many flavours of payload formats are possible, so that it is preferable to lower down the number of possibilities. Therefore, the generic meta data description about the properties and scaling options of scalable source codecs is preferable, as outlined above.

As shown in FIG. 10, the streaming application has to map the meta data description into the descriptor information LID ⑧, partitioned into one or more descriptor LID sets and then, e.g., as 'forward information' included into the PATH-message. It should be noted that any other QoS signaling protocol can be used apart from RSVP, e.g., next steps in signaling NSIS.

As outlined above, the descriptor LID specifies how to process the data payload in case of temporary or persistent congestion and a particular set of such a descriptor information specifies one particular option how to achieve such a scaling of data payload. If a networking node, e.g., a router or access point, supports local adaptation policies, during creation of the PATH-state, also a LID-state is created, as explained above, which is also bound to the PATH-state. To gain from local rate adaptation, the local policies need to access the descriptor LID-state so that each payload data frame transmitted is marked with a label ⑨. To facilitate that the local adaptation policy retrieves the correct descriptor information LID, the binding of a descriptor information LID set to a label is done by the application and sent as 'forward information', as described above.

As shown in FIG. 10, during transmission of video frames, in view of quality concerns with respect to a wireless link, the access point such as the truncation option ⑩, to reduce the bit rate in order to guarantee a perceived quality. Therefore, the access point uses label information from packet frames and retrieves the related descriptor information LID. Then, local adaptation policies may start to truncate the media payload according to description in the descriptor information LID. When the user closes the streaming session, the corresponding application releases the association with the streaming server by sending a BYE-message.

Therefore, in view of the example given in FIG. 10, while according to prior art network elements have no information on properties of the used codec(s), according to the technology described in this application, apart from the media content, additional forward information is sent over the communication network to improve service delivery. To reduce the overhead of packet frames, descriptors LID are changed during session set-up to create descriptor LID states in network elements which leads to an association of each particular descriptor LID with a label. Therefore, during media streaming only this label is included in the packet frames. Network elements are used in the label and the established descriptor LID state for appropriate treatment of packet frames and performing of adaptation, if necessary. From a more efficient service delivery the LID states should not be bound to a specific layer but used as layer-independent states. I.e., any layer in possession of the label should have access to the corresponding descriptor LID state to exploit application reference information for rate adaptation and unequal error protection. Of particular interest for descriptor information LID are network-, link-, and physical layers. Here, the network layer may use the information to circumvent buffer overflow due to congestion or burst resources while least affecting the user-perceived quality. The link- and physical layers could, e.g., utilize an information to apply sophisticated channel coding and modulation techniques based on error protection preference of transmitted data.

Figure 11:
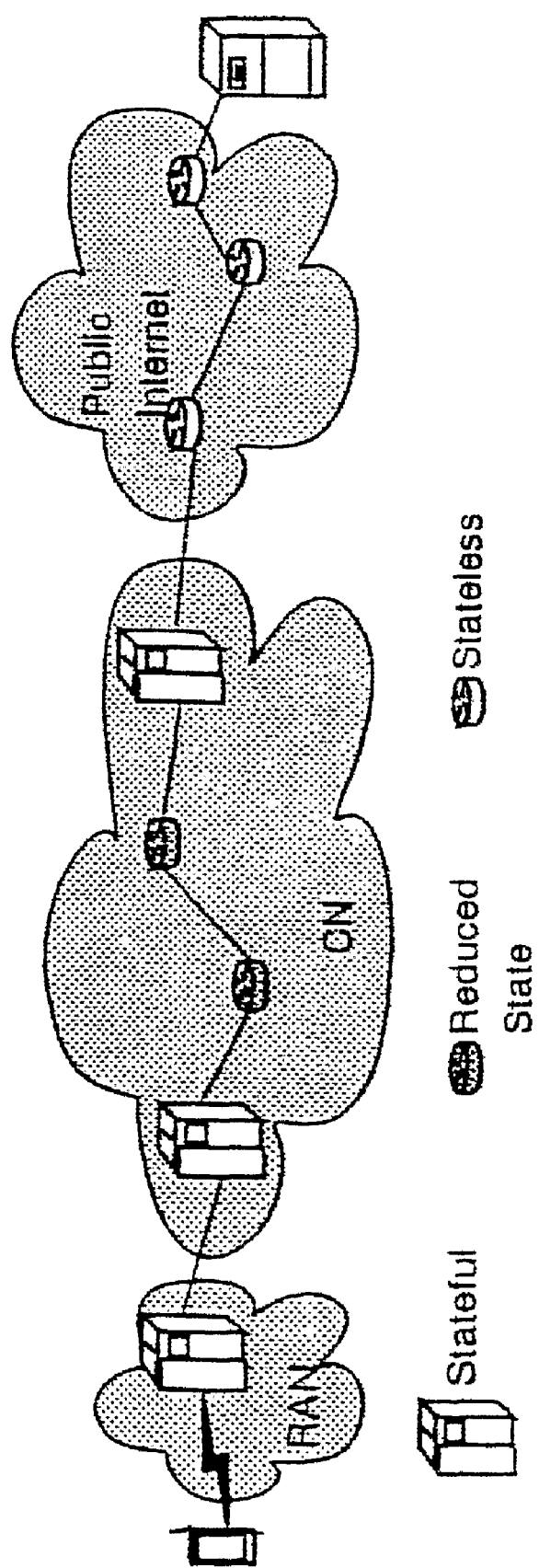
FIG. 11 shows different application scenarios

FIG. 11 shows different application scenarios.

As shown in FIG. 11, with respect to the descriptor LID layer processing, network elements can be categorized into (i) stateless, (ii) reduced-state and (iii) stateful entities. Stateless elements process neither LID label set-up signaling messages nor the labels of data packets. Reduced-state elements still do not store the LID-label data but apply simplified adaptation procedures which are already used. Here, reduced-state entities may be DiffServ aware, and hence a DiffServ forwarding can be used to realize drop preference differentiation amongst the packet frames. Further, stateful network elements are aware of LID information and labels. Stateful entities maintain a LID-label data storage allowing for sophisticated adaptation of data rates and error protection schemes which property renders stateful elements the preferred choice for controlling wireless transmission, since rate adaptation with truncation option and unequal error protection are techniques best suiting the wireless channel characteristics.

By setting up a network from these three types of entities, a good trade opportunity complexity and adaptation performance may be found. Also, the introduction of stateless and reduced-state elements allows for compatibility with older networks parts as well as for the stepwise introduction of the descriptor LID functionality.

Also, it would also be possible to combine the concept of local adaptation as outlined above with the rate adaptation schemes available, i.e. the end-to-end adaptation scheme wherein adaptation is achieved between service delivery and service receiving point, and/or the network feedback adaptation scheme wherein the network provides feedback to the service delivery point such that the application generating a data stream adapts the amount of traffic flow in the network. Here, end-to-end adaptation is mainly an application layer method and network feedback entirely relies on cross-layer signaling between the network and the application. The reason why local adaptation has been set forth in the explanations given above is that it is well suited to respond in short term to any change of networking conditions in the communication network. Preferably, application end points should not be directly involved in short-term adaptation as the introduced feedback delay would be against the aim of adaptation to fast transient phenomena. This allows to maintain the highest possible service quality even with difficult temporal transmission conditions as short-term effects can be addressed by local adaptation policies deployed at network elements near the appearance of transient events.

Figure 12:
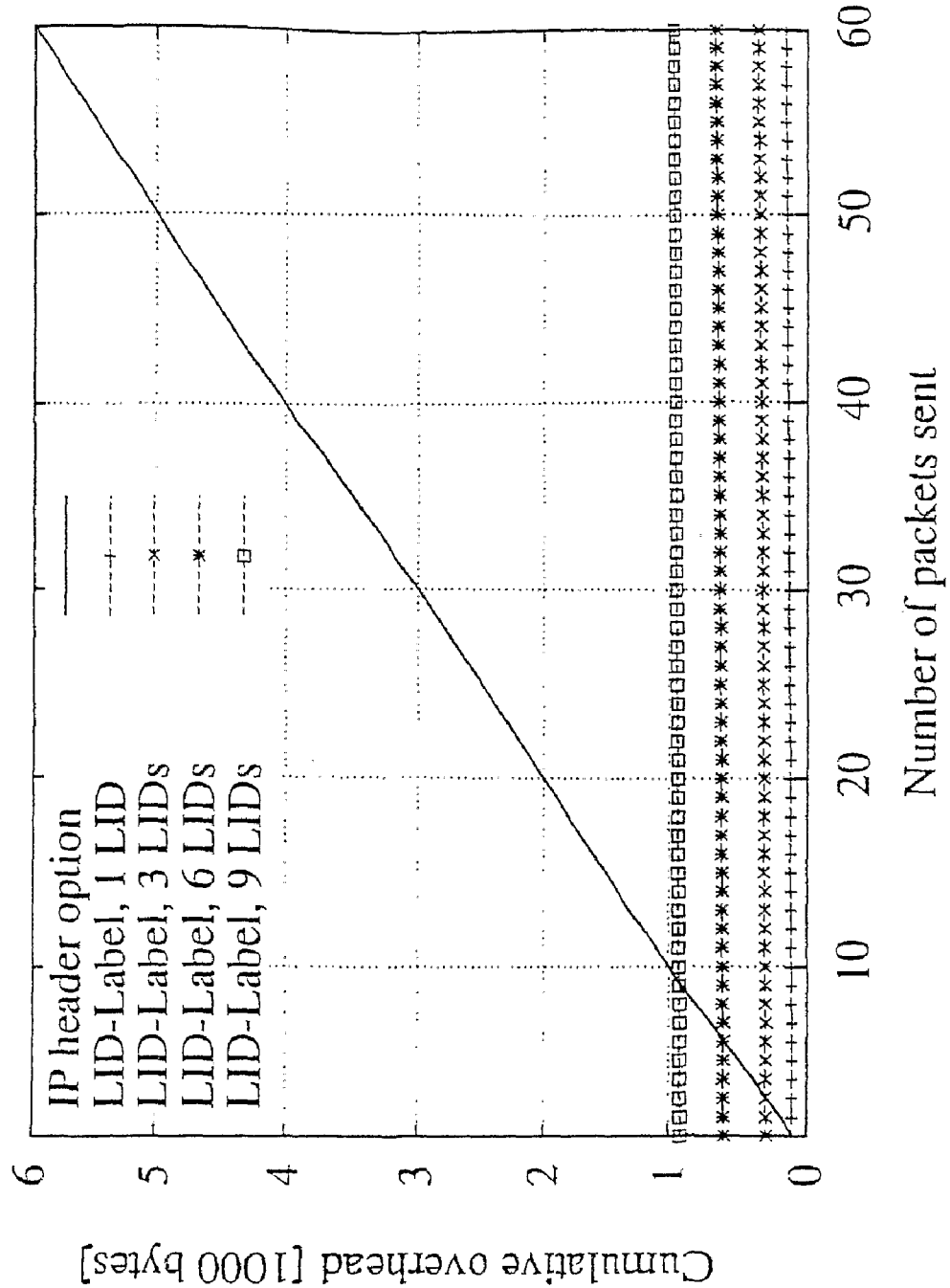
FIG. 12 shows a comparison between an IP header option scheme for local adaptation and the use of descriptor information in networking nodes for local adaptation.

FIG. 12 shows a comparison of the IP header option scheme for local adaptation and the use of descriptor information in a networking node for local adaptation. Both methods can be used to signal LID information associated to packet frames.

As shown in FIG. 12, the LID label binding procedure exploits the fact that there are a great number of data frames but only a limited number of adaptation possibilities in view of a particular codec. I.e., there is no need to include the descriptor LID in each packet frame since most of the time the same information would be transmitted.

According to FIG. 12, the LID information signaling overhead is shown. When the IP header option is used, the whole LID information must be included in each packet frame. With the LID labeling method as outlined above, different LID information sets must only be sent once, at the beginning of the session, and then only short labels are used in the packet frame.

This way, the major overhead is introduced at session set-up.

In FIG. 12, four LID label scenarios are shown. Firstly, of a codec supports only one media-frame type and scaling feature, only one LLD label must be distributed at session set-up. The other examples support the availability of multiple LID label descriptors.

From FIG. 12 it becomes clear that if a session consists of only a few packets, then due to the overhead introduced at session set-up the LID labeling scheme is inferior to the IP header option scheme. However, the targeted audiovisual applications have usually a high amount of packet frames to transmit. Hence, for the operating range of practical scenarios, the LID label binding severely outer performs the header option scheme.

Overall, the LID descriptor approach is a network layer explicit signaling approach and has the benefit that the information is per packet frame instead of per media frame generated on the application layer. Moreover, the information is provided out-of-band and there is not need for passing higher layer headers. This way, not only processing overhead is reduced, but the LID descriptor approach renders to be a general framework as it can be applied for any current and future codecs and applications.

In particular, at wireless links one has to cope with fast varying radio channel conditions. Hence, fast rate adaptation RA and unequal error protection techniques are necessary, which can only be applied locally where transmission quality concerns appear. Relying on header parsing and transcoding which require the reconstruction of entire source units and introduce unacceptable delay. On the other hand, with DiffServ concepts only differentiation amongst packet frames is possible. The technology described in this application provides packet structure information yielding fine grained adaptation information for unequal

The invention claimed is:

1. A method of controlling at least one media stream in a network apparatus operated in a packet switched communication network, comprising:
    installing the descriptor information in nodes of a packet switched communication network for local adaptation of the media stream in the packet switched communication network, wherein descriptor information specifies options for control of the media stream, describes at least one packet frame type in the media stream in relation to a label carried in the media stream for reference to the packet frame description, and includes a packet frame type description which permits distinguishing between different packet frame types;
    binding a label to the descriptor information which is marked in packets of the media stream during a media streaming session;
    analyzing the media stream to identify at least one label carried in the media stream; and
    controlling a media stream adaptation, if necessary, through access to the descriptor information using the identified at least one label.

2. The method according to claim 1,
    wherein it comprises a step of mapping a generic meta-data description onto the descriptor information comprises a step of incorporating a traffic class group identifying whether a media stream is loss-tolerant and/or whether an application end-point runs an adaptive and/or scalable application.

3. The method according to claim 2,
    wherein the step of mapping the generic meta-data description onto the descriptor information comprises a step of incorporating an error protection preference group identifying a requested protection level for a packet frame type.

4. The method according to claim 3,
    wherein error protection preference group further identifies information on the structure of the packet frame type for unequal packet frame level error protection by defining starting points inside the packet frame type corresponding to related protection levels.

5. The method according to claim 1,
    wherein the step of mapping of the generic meta-data description onto the descriptor information comprises a step of incorporating a packet frame drop preference group identifying packet frame drop preferences, packet frame drop dependencies, and/or packet frame truncation options.

6. The method according to 5,
wherein packet frame truncation options reflect possibilities for data chopping with respect to a packet frame type and/or offsets of packet frame truncation points.

7. The method according to claim 1,
wherein the descriptor information is installed such that different protocol layers of a networking protocol stack having access to a label also have access to the corresponding descriptor information.

8. The method according to 7,
wherein it comprises a step of cross-layer forwarding of a label between different protocol layers of a networking protocol stack.

9. The method according to claim 1,
wherein the step of installing the descriptor information is achieved by forwarding the descriptor information to the packet switched communication network during set-up of a communication channel for service delivery.

10. The method according to claim 1,
wherein the step of installing the descriptor information is achieved by forwarding the descriptor information to the packet switched communication network prior to setup of a communication channel for service delivery, so as to pre-establish the descriptor information in the packet switched communication network.

11. The method according to claim 1,
wherein the step of installing the descriptor information is achieved by modelling generated descriptor information using pre-defined descriptors having a pre-defined relations to identifications the packet frame types, without actual exchange of descriptor information to the packet switched communication network.

12. The method according to claim 1,
wherein the step of controlling the media stream adaptation comprises the steps:
using descriptor information describing at least one packet frame type in the media stream and the label to decide on the necessity and the action of the media stream adaptation; and
executing the media stream adaptation for the media stream according to at least one descriptor information being associated to the label if necessary.

13. A computer program product stored in a non-transitory memory of a service delivery apparatus, comprising software code portions for performing the steps of claim 1 when the product is run on a computer processor of the service delivery apparatus.

14. The method in claim 1, wherein the descriptor information comprises a traffic class group field that identifies general service adaptation properties, a packet drop preference group field, and an error protection preference group field.

15. A network node apparatus for controlling a media stream carried in a packet switched communication network, comprising:
one or more computer processors,
a computer-implemented analysis unit adapted to analyze the media stream to identify at least one label carried in the media stream,
wherein descriptor information provided to the network node apparatus specifies options for control of the media stream, describes at least one packet frame type in the media stream in relation to the label carried in the media stream for reference to the packet frame type description, and includes a packet frame type description which permits distinguishing between different packet frame types; and
a computer-implemented descriptor state creating unit adapted to bind the descriptor information describing the at least one packet frame type in the media stream to at least one label;
a computer-implemented media stream controlling unit adapted to control a media stream adaptation, if necessary, through access to the descriptor information using the identified at least one label.

16. The network node apparatus according to claim 15,
wherein the computer-implemented media stream controlling unit comprises:
a local adaptation evaluation unit adapted to use descriptor information describing at least one packet frame type in the media stream and the label to conclude on the necessity and action of the media stream adaptation; and
a local adaptation executing unit adapted to execute the media stream adaptation for the media stream according to at least one descriptor being associated to the label if necessary.

17. The network node apparatus according to claim 16,
wherein the local adaptation executing unit is adapted to achieve rate adaptation and/or unequal error protection for the media stream.

18. The network node apparatus according to 17,
wherein the computer-implemented descriptor state creating unit is adapted to forward a label between different protocol layers of a networking protocol stack.

19. The network node apparatus according to claim 15, further comprising a descriptor receiving unit adapted to receive the descriptor information at the network apparatus prior to control of media streaming.

20. The network node apparatus according to claim 15,
wherein the computer-implemented descriptor state creating unit is adapted to create the descriptor information such that different protocol layers of a networking protocol stack having access to a label also have access to the corresponding descriptor information.

21. The network node apparatus according to claim 15, wherein the descriptor information comprises a traffic class group field that identifies general service adaptation properties, a packet drop preference group field, and an error protection preference group field.

22. A service delivery apparatus adapted to provide description information, comprising:
one or more computer processors,
a computer-implemented descriptor installation unit adapted to install the descriptor information and an associated label in the packet switched communication network for local adaptation of the media stream in the packet switched communication network,
wherein descriptor information specifies options for control of the media stream, describes at least one packet frame type in the media stream in relation to a label carried in the media stream for reference to the packet frame type description, and includes a packet frame type description which permits distinguishing between different packet frame types;
wherein the label is bound, in the packet switched network, to the descriptor information which is marked in packets of the media stream during a media stream session;
whereby one or more computer-implemented network nodes in the packet switched network can analyze the media stream to identify the at least one label carried in the media stream and control the media stream adaptation, if necessary, through access to the descriptor information using the identified at least one label.

23. The service delivery apparatus according to claim 22, wherein the descriptor installation unit is adapted to install the descriptor information by forwarding the descriptor information to the packet switched communication network during set-up of a communication channel for service delivery.

24. The service delivery apparatus according to claim 22, wherein the descriptor installation unit is adapted to install the descriptor information by forwarding the descriptor information to the packet switched communication network prior to set-up of a communication channel for service delivery, so as to pre-establish the descriptor information in the packet switched communication network.

25. The service delivery apparatus according to claim 22, wherein the descriptor generating unit is adapted to model descriptor information using pre-defined descriptors having pre-defined relations to identifications of the packet frame types, for installation of descriptor information without actual exchange of descriptor information to the packet switched communication network.

26. The service delivery apparatus according to claim 22, wherein the descriptor information comprises a traffic class group field that identifies general service adaptation properties, a packet drop preference group field, and an error protection preference group field.

* * * * *

UNITED STATES PATENT AND TRADEMARK OFFICE
CERTIFICATE OF CORRECTION

Page 1 of 1

PATENT NO. : 8,271,674 B2
APPLICATION NO. : 11/991148
DATED : September 18, 2012
INVENTOR(S) : Takacs et al.

It is certified that error appears in the above-identified patent and that said Letters Patent is hereby corrected as shown below:

In the Drawings

In Fig. 11, Sheet 8 of 9, delete " 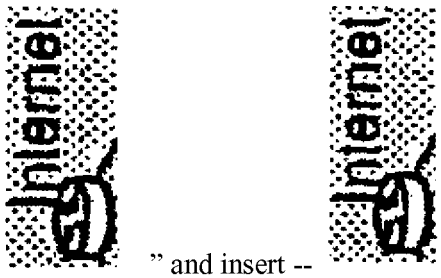 " and insert -- -- , therefor.

In the Specification

In Column 6, Line 15, delete "scenarios" and insert -- scenarios; -- , therefor.

In Column 18, Line 23, delete "unequal" and insert -- unequal. -- , therefor.

In the Claims

In Column 18, Line 35, in Claim 1, delete "frame description," and insert -- frame type description, -- , therefor.

Signed and Sealed this
Twenty-second Day of July, 2014

Michelle K. Lee
*Deputy Director of the United States Patent and Trademark Office*